(12) United States Patent
Nealer et al.

(10) Patent No.: US 8,732,147 B2
(45) Date of Patent: May 20, 2014

(54) DATA COLLECTIONS ON A MOBILE DEVICE

(75) Inventors: Bryan W. Nealer, Seattle, WA (US); Jeremiah T Whitaker, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/051,879

(22) Filed: Mar. 18, 2011

(65) Prior Publication Data

US 2012/0239651 A1  Sep. 20, 2012

(51) Int. Cl.
G06F 17/30 (2006.01)
(52) U.S. Cl.
USPC .......................................... 707/705; 707/737
(58) Field of Classification Search
USPC .................................. 707/705, 737
See application file for complete search history.

(56) References Cited

U.S. PATENT DOCUMENTS

| | | | |
|---|---|---|---|
| 7,363,035 B2 | 4/2008 | Reilly | |
| 7,650,342 B2* | 1/2010 | Sugiyama et al. | 707/770 |
| 7,783,993 B2 | 8/2010 | Welingkar | |
| 8,543,569 B2* | 9/2013 | Pandolfi | 707/723 |
| 2006/0143622 A1 | 6/2006 | Prabandham et al. | |
| 2006/0242234 A1 | 10/2006 | Counts et al. | |
| 2007/0240079 A1 | 10/2007 | Flynt et al. | |
| 2008/0178104 A1 | 7/2008 | Kim | |
| 2008/0306930 A1 | 12/2008 | Diederiks et al. | |
| 2009/0287559 A1* | 11/2009 | Chen et al. | 705/14.23 |
| 2010/0008495 A1* | 1/2010 | Bulgari | 379/436 |
| 2010/0131977 A1* | 5/2010 | San Jule et al. | 725/37 |
| 2011/0066613 A1* | 3/2011 | Berkman et al. | 707/734 |
| 2011/0066941 A1* | 3/2011 | Chipchase et al. | 715/716 |
| 2011/0314396 A1* | 12/2011 | Diab et al. | 715/760 |
| 2012/0102164 A1* | 4/2012 | Gruen et al. | 709/222 |
| 2012/0102165 A1* | 4/2012 | Gruen et al. | 709/222 |
| 2012/0166555 A1* | 6/2012 | Petno | 709/206 |

OTHER PUBLICATIONS

Google Personalized Home for mobile, published Jan. 2006, <<http://static.googleusercontent.com/external_content/untrusted_dlcp/www.google.com/en/intl/en/press/guides/p_home_mobile.pdf>>.

* cited by examiner

*Primary Examiner* — Kim Nguyen
(74) *Attorney, Agent, or Firm* — Aaron Chatterjee; Andrew Sanders; Micky Minhas

(57) ABSTRACT

Data collections on a mobile device may be user-defined to include various types of objects including any combination of apps, contacts, email subscriptions, data feeds, and so on. A user interface associated with the data collection includes representations of the various objects associated with the data collection and representations of broadcast data received in association with the objects associated with the data collection.

20 Claims, 5 Drawing Sheets

DATA COLLECTIONS ON A MOBILE DEVICE

BACKGROUND

Mobile device applications ("apps") have become increasingly popular, and provide mobile device users with a wide variety of additional functionality and data access not previously available on mobile devices. As the number of apps downloaded to a mobile device increases, it becomes more difficult for a user to quickly locate and access a desired application, and it becomes more likely that any particular downloaded app will be accessed less frequently.

Furthermore, mobile device users frequently find themselves with small blocks of time during which they may want to quickly be able to access information. For example, while in a doctor's office waiting room, a user may choose to access a news application to get a quick update on current headlines, or may choose to launch a social networking application to check for any recent status updates. However, as the number of data sources available through a mobile device increases, it becomes more difficult for a user with a limited window of time to quickly choose and access a data source of interest.

SUMMARY

This document describes data collections on a mobile device. The data collections may be user-defined to include any number of different types of objects such as apps, contacts, email subscriptions, and so on. A user interface for displaying a data collection includes an area for displaying representations of the objects that are part of the data collection and an area for displaying broadcast data that is received in association with one or more of the objects associated with the data collection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Data collections on mobile devices provide logical groupings of mobile device applications ("apps") and other content or objects. A user interface that supports data collections, as described herein, also provides a visible container to which real-time information may be surfaced from any member of a data collection.

Data collections may be defined by a user and may include any combination of objects, including, but not limited to, applications, contacts, and data streams (e.g., Really Simple Syndication (RSS) feeds, email subscriptions, podcasts, etc.). Data collections may also include applications or other objects through which real-time information is not available.

A user interface is provided for viewing the contents of a data collection, including a summary of at least some of the real-time information received in association with the objects that are part of the data collection. The summary of information is dynamically updated as data is received. In this way, a user is able to quickly view current data from multiple data sources without having to launch or otherwise interact with each individual object. After viewing the summary of real-time information associated with the data collection, the user may wish to view additional details associated with particular information included in the summary. To enable easy access to the data sources, the user interface also provides an area through which the user can launch or otherwise select any of the objects of the data collection.

Example Environment

Figure 1:
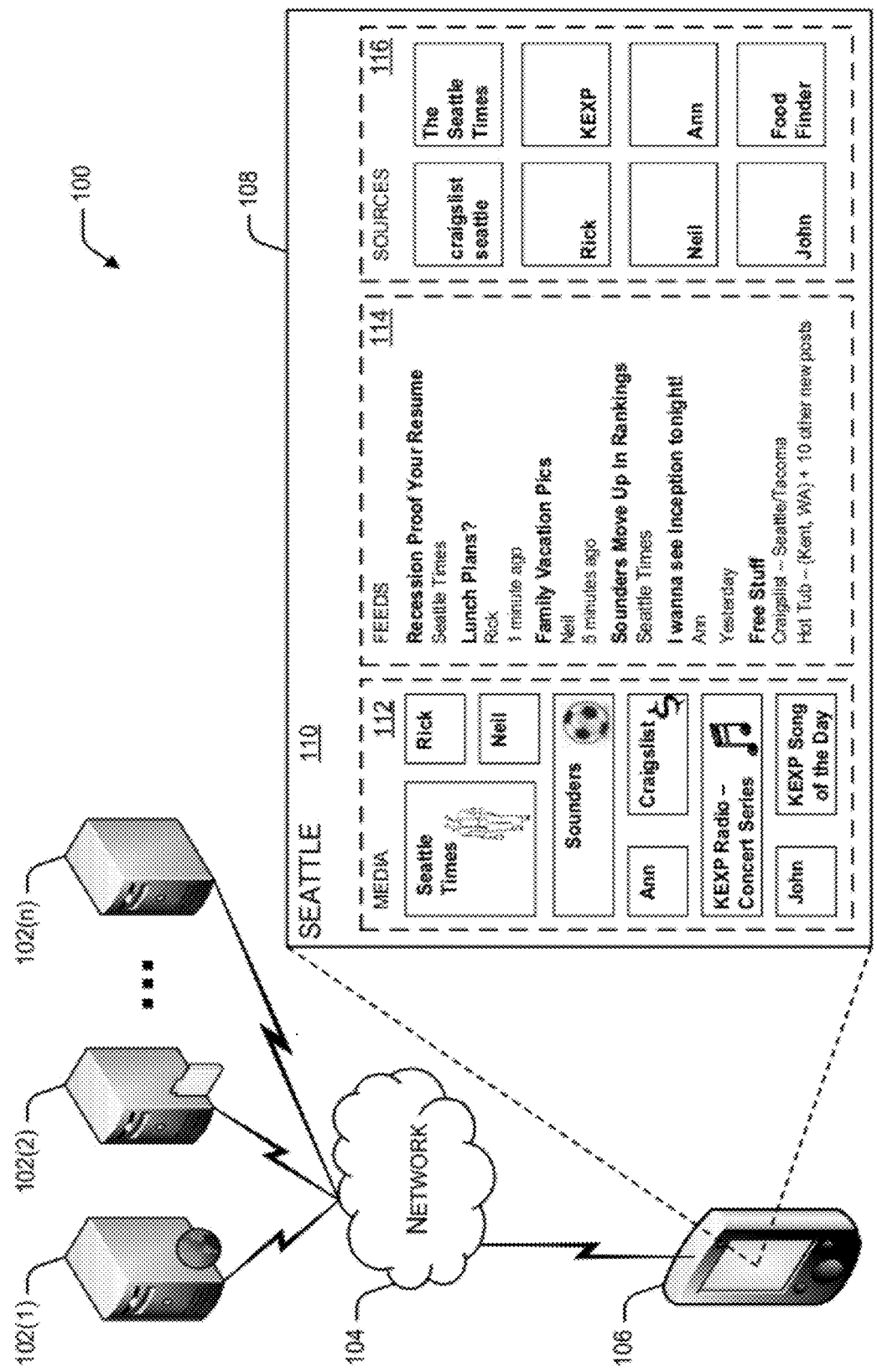
FIG. 1 is a pictorial diagram of an example environment in which data collections on a mobile device may be implemented.

FIG. 1 illustrates an example environment 100 usable to implement data collections on a mobile device. Example environment 100 includes servers 102, network 104, and mobile device 106. Servers 102 may include, for example, web server 102(1), application server 102(2), and any number of other data servers 102(n). Network 104 is representative of any type of communication network including, for example, the Internet. Mobile device 106 is representative of any type of mobile device configured to receive data over network 104. For example, mobile device 106 may be implemented as a mobile phone, a personal digital assistant (PDA), a netbook, a tablet computer, a handheld computer, and so on.

Mobile device 106 presents a user interface 108 that displays a data collection, which may be user customizable. In the illustrated example, user interface 108 displays a user-defined data collection 110 entitled "Seattle." The example user interface 108 includes a "media" section 112, a "feeds" section 114, and a "sources" section 116. Media section 112 and feeds section 114 each display data based on the sources 116 associated with the Seattle data collection. In the illustrated example, the Seattle data collection includes various types of sources, including apps (e.g., The Seattle Times app), contacts (e.g., Rick), RSS feeds (e.g., Craigslist Seattle), and email subscriptions (e.g., KEXP).

As data is received from the various sources that are part of the data collection 110, the media section 112 and the feeds section 114 are dynamically updated to reflect the data as it is received. For example, as news stories are made available through the Seattle Times app, images associated with those news stories may be displayed in the media section 112. Similarly, a title of the news story and an indication that it is from The Seattle Times may be displayed in the feeds section 114. Data associated with contacts that are associated with the data collection may also be displayed in the media section 112 and/or the feeds section 114. For example, when contact Rick posts a new Facebook status or sends a tweet through his Twitter account, an indication of such may appear in the media section 112 and/or the feeds section 114.

In the example illustrated in FIG. 1, a user may have defined data collection 110, entitled "Seattle," to provide centralized access to various apps, contacts, and other data sources that are each, in some way, related to "Seattle." The user may have then specified the various sources 116 to be included in the "Seattle" data collection 110. For example, as illustrated in FIG. 1, the sources may include "craigslist seattle," which is an RSS feed from the "free stuff" category of the "craigslist" website; "The Seattle Times," which is an app providing access to news content; "KEXP," which represents any number of email subscriptions or podcasts from a Seattle-based radio station; "Rick," "Neil," "Ann," and "John," who are each contacts from whom data may be received, for example, in the form of email, social networking posts (e.g., Twitter tweets or Facebook posts), instant messages, and so on. The user-defined data collection may also include elements that do not send data. For example, "Seattle" data collection 110 may also include an app entitled "Food Finder" that may, for example, utilize global positioning system (GPS) data to identify restaurants that are located within a close proximity to the mobile device 106. Even though the app may not automatically send data (meaning no entries from this app would appear in the media section 112 or the feeds section 114), the user may frequently use the app when in Seattle, and may therefore choose to include it as part of the "Seattle" data collection 110.

Figure 2:
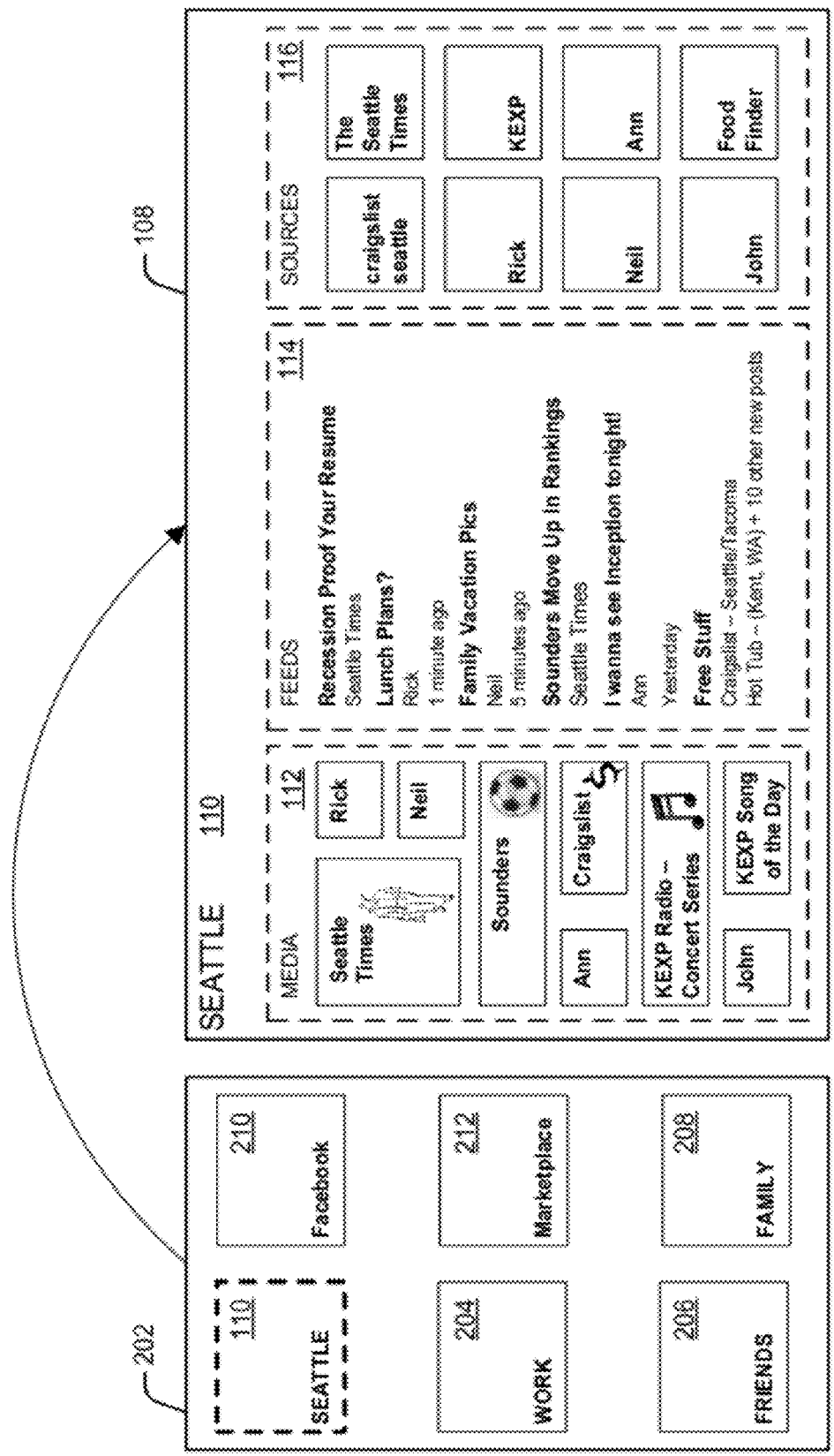
FIG. 2 is a pictorial diagram of example user interface screens for displaying data associated with data collections.

FIG. 2 illustrates an example transition from a first user interface 202 to previously described user interface 108. In the illustrated example, user interface 202 includes representations of multiple data collections, as well as other interactive items. For example, user interface 202 includes representations of a "Seattle" data collection 110, a "Work" data collection 204, a "Friends" data collection 206, and a "Family" data collection 208. User interface 202 may also include other interactive items such as a "Facebook" app 210 and a "Marketplace" app 212, which may or may not also be included in one or more defined data collections. In the illustrated example, when a user selects a particular data collection (e.g., "Seattle" 110), the user interface transitions to display details associated with the selected data collection. In the illustrated example, when the user selects the "Seattle" data collection 110, user interface 108 is displayed in response.

Figure 3:
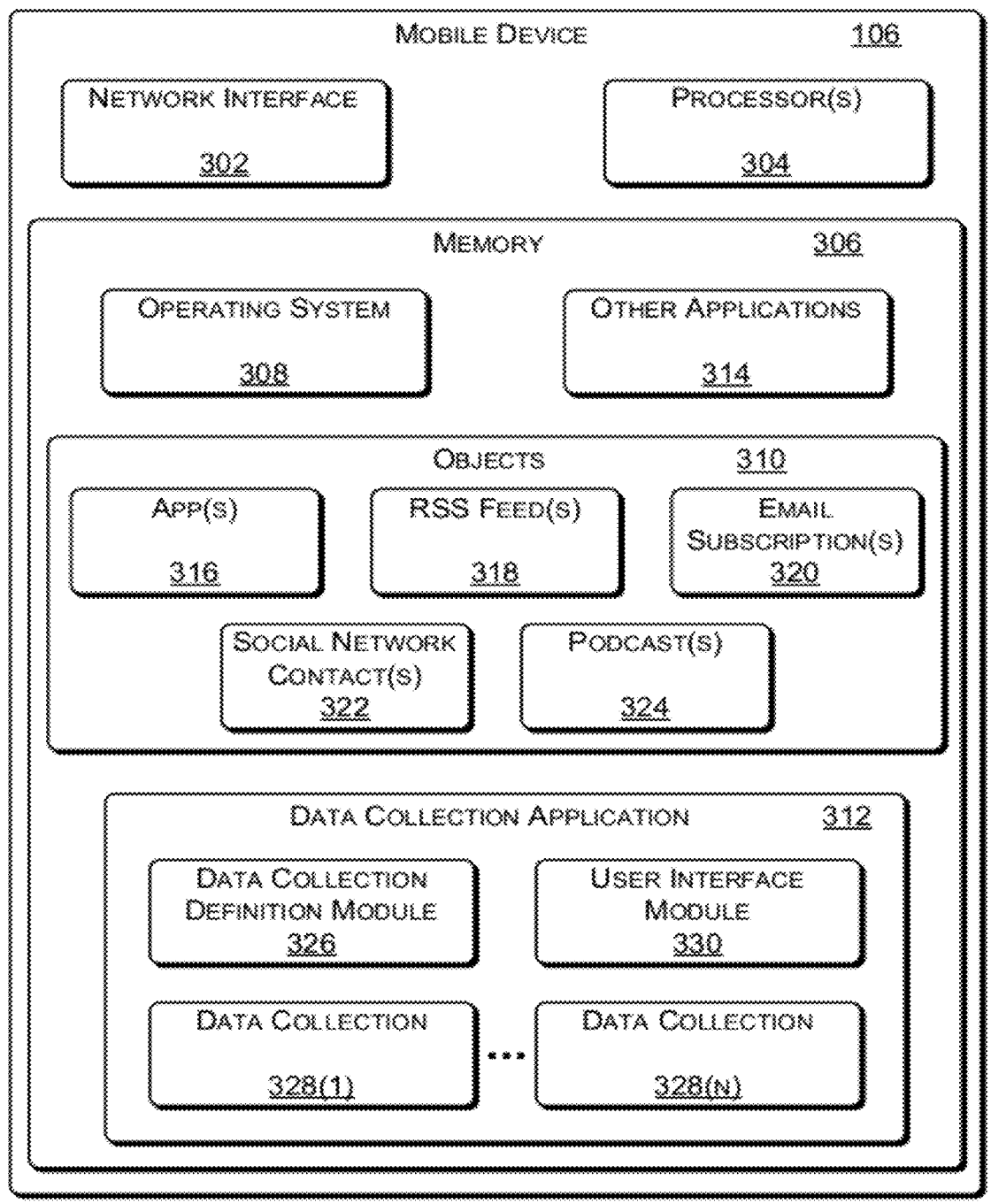
FIG. 3 is a block diagram that illustrates components of an example mobile device configured to implement data collections.

FIG. 3 illustrates components of an example mobile device 106 configured to support data collections as described herein. Example mobile device 106 includes a network interface 302, one or more processors 304, and a memory 306. Network interface 302 enables mobile device 106 to send and/or receive data over a network 104. Network interface 302 may also represent any combination of other communications interfaces to enable mobile device 106 to send and/or receive various types of communication, including, but not limited to, web-based data and cellular telephone network-based data.

An operating system 308, any number of objects 310, a data collection application 312, and any number of other applications 314 are stored in memory 306 as computer-readable instructions, and are executed, at least in part, on processor 304. Objects 310 may include any combination of the following: any number of apps 316, any number of RSS feeds 318, any number of email subscriptions 320, any number of social network contacts 322, and any number of podcasts 324. In addition to the example objects illustrated in FIG. 3, objects 310 may further include any object or data source available to a user through mobile device 106.

Apps 316 may include any number of various types of applications that may be executed on mobile device 106. These apps 316 may include, but are not limited to, games, productivity tools, merchant-specific applications (e.g., apps through which airlines or other merchants provide information regarding special offers, etc.), entertainment applications, lifestyle applications, reference applications, navigation applications, health and fitness applications, and so on. Some applications, like, for instance, merchant-specific applications, may be configured to receive data that is pushed, for example, from the merchant to the client device. Such data is received, even when the app is not currently being executed, and typically is made available to the user when the app is launched. Other applications like, for instance, games, productivity tools or reference applications may not be configured to receive data over the network, but rather, function as stand-alone applications.

RSS feeds 318, email subscriptions 320, social network contacts 322, and podcasts 324 each represent objects with which a user can interact to access broadcast data. For example, a user may subscribe to RSS feeds 318, email subscriptions 320, and podcasts 324. In response to the user subscription, data is pushed over the network 104 to the mobile device 106. Similarly, social network contact 322 represents an individual or entity (e.g., a musical group) that the user has chosen to follow, for example, by becoming a "friend" or "fan" through a social networking site like Facebook or Twitter. In response to following a particular contact, status updates, tweets, and other data broadcast by that contact is pushed to mobile device 106.

Data collection application 312 includes data collection definition module 326, data collections 328, and user interface module 330. Data collection definition module 326 enables the creation and maintenance of data collections by which various combinations of object 310 may be associated with one another. For example, data collection 328(1) may be defined by a user through data collection definition module 326 to associate an app 316, an RSS feed 318, and a social network contact 322 together in one collection. Similarly, another data collection, 328(n) may be defined through data collection module 326 to associate an email subscription 320, a podcast 324, and another social networking contact 322 together in another collection. Through data collection definition module 326, a user may, for example, create a data collection, add objects to a data collection, remove objects from a data collection, rename a data collection, or delete a data collection.

User interface module 330 dynamically generates a user interface for displaying information associated with data collections 328. For example, user interface module 330 may dynamically generate user interface displays that are similar to user interface 202 and user interface 108 shown in FIG. 1 and FIG. 2.

Although illustrated in FIG. 3 as being stored in memory 306 of mobile device 106, objects 310 and data collection application 312, or portions thereof, may be implemented using any form of computer-readable media that is accessible by mobile device 106. Furthermore, in alternate implementations, one or more components of operating system 308, objects 310, data collection application 312, and other applications 314 may be implemented as part of an integrated circuit that is part of, or accessible to, mobile device 106. Furthermore, although illustrated and described as being implemented on a mobile device 106, the data access and other functionality provided by data collections as described herein may also be implemented on any other type of computing device through which a user can access data.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Example Operation

Figure 4:
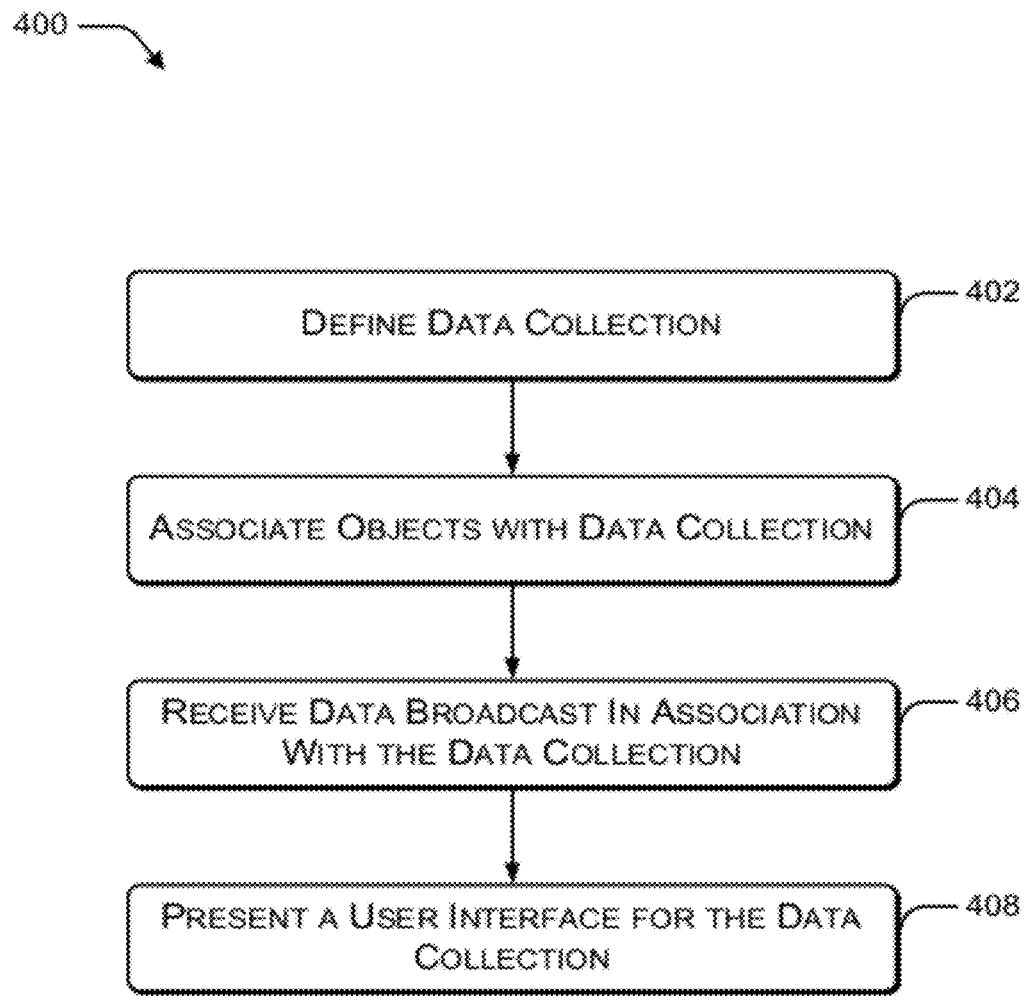
FIG. 4 is a flow diagram of an example process for implementing data collections on a mobile device.
Figure 5:
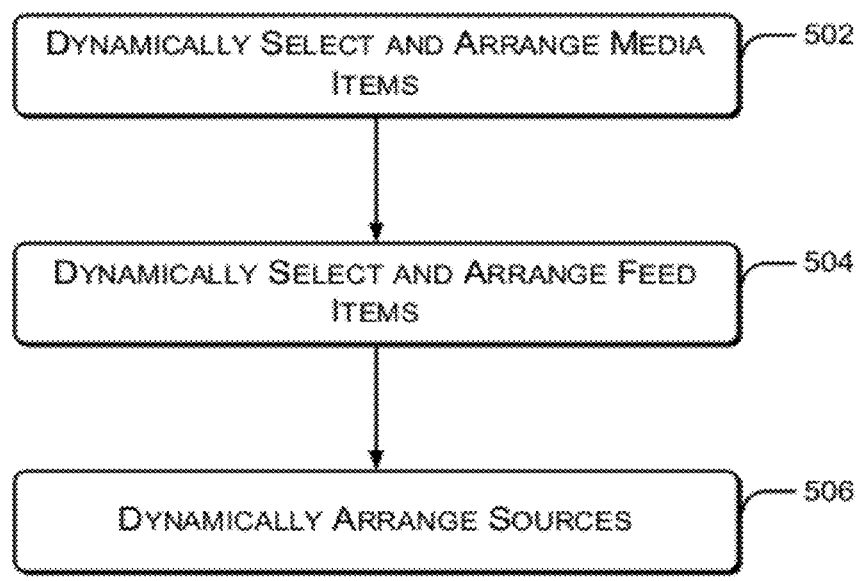
FIG. 5 is a flow diagram that illustrates an example process for presenting a user interface associated with a data collection.

FIGS. 4 and 5 illustrate an example process 400 for implementing data collections as described herein. This process is illustrated as a collection of blocks in a logical flow graph, which represents a sequence of operations that can be implemented in hardware, software, or a combination thereof. In the context of software, the blocks represent computer-executable instructions stored on one or more computer storage media that, when executed by one or more processors, cause the processors to perform the recited operations. Note that the order in which the process is described is not intended to be construed as a limitation, and any number of the described process blocks can be combined in any order to implement the process, or alternate processes. Additionally, individual blocks may be deleted from the processes without departing from the spirit and scope of the subject matter described herein. Furthermore, while this process is described with reference to the mobile device 106 described above with reference to FIG. 1 and FIG. 3, other computer architectures may implement one or more portions of this process, in whole or in part.

FIG. 4 illustrates an example process 400 for defining a data collection and generating a user interface for presenting broadcast data that is received in association with the data collection.

At block 402, a data collection is defined. For example, through interaction with data collection definition module 326, a user defines a data collection. For example, data collection definition module 326 may include a user interface through which a user may specify a name for a new data collection. Alternatively, data collection definition module 326 may be configured to automatically create a data collection based on a determined relationship between two or more objects.

At block 404, objects are associated with the data collection. For example, a user may specify one or more objects to be associated with the data collection through a user interface provided by the data collection definition module 326. Alternatively, data collection definition module 326 may be configured to automatically suggest objects to include in a data collection.

At block 406, broadcast data received in association with one or more objects in the data collection is identified. For example, if the data collection includes an app, data broadcast to the app by a distributor of the app may be identified. Similarly, if the data collection includes a social networking contact, a social network status update of the contact may be identified.

At block 408, a user interface associated with the data group is dynamically generated or updated. For example, as described above with reference to FIG. 1, user interface 108 includes media section 112, feeds section 114, and sources section 116. In an example implementation, sources section 116 includes representations of each object associated with the data collection. The arrangement of the displayed representations of the objects may be dynamically updated, for example, based on a frequency with which data is received in association with the objects, based on a relative amount of time since data was most recently received in association with each object, or based on any other sorting, ranking, or organizing criteria.

The media section 112 and the feeds section 114 are each dynamically generated based on recent data received in association with the objects of the data collection. The data shown in the media section 112 and the feeds section 114 may be organized based on any number of criteria as well. Furthermore, the criteria used to arrange data in the media section 112 may differ from the criteria used to arrange data in the feeds section 114. For example, in the media section 112, a size and/or a relative location of a representation of a particular data source may be based on any combination of frequency of received data, relative duration since the most recently received data from each data source, and/or frequency with which a user accesses data associated with the data source. Similarly, the order of data shown in the feeds section 114 may also be based on any one or more criteria.

FIG. 5 illustrates an example process 408 for dynamically generating or updating a user interface for a data collection.

As described above with reference to block 406 of FIG. 4, data associated with one or more objects in a data collection is received. In response to receiving the broadcast data, at block 502, media items associated with the data collection are dynamically selected and arranged. For example, as illustrated in media area 112 of user interface 108 in FIG. 1, visual representations of the received broadcast data are displayed. The size and/or position of the visual representations may be dynamically determined based on any number of factors including, but not limited to, a frequency with which data is received in association with the objects, based on a relative amount of time since data was most recently received in association with each object, or based on any other sorting, ranking, or organizing criteria.

At block 504, feed items associated with the data collection are dynamically selected and arranged. For example, textual representations of recently received broadcast data are displayed in the feeds section. As with the media section, the order of the information presented in the feeds section may be dynamically determined based on any number of factors including, but not limited to, a frequency with which data is received in association with the objects, based on a relative amount of time since data was most recently received in association with each object, or based on any other sorting, ranking, or organizing criteria. Furthermore, the criteria used to arrange the feed items may be the same as or different from the criteria used to arrange the media items.

At block 506, sources associated with the data collection are arranged. For example, as shown in FIG. 1, the a sources area displays representations of each of the objects associated with the data collection. The sources may be dynamically arranged, as with the media items and feed items, based on any reasonable criteria.

CONCLUSION

Although the subject matter has been described in language specific to structural features and/or methodological operations, it is to be understood that the subject matter defined in the appended claims is not necessarily limited to the specific features or operations described. Rather, the specific features and acts are disclosed as example forms of implementing the claims.

What is claimed is:

1. A method comprising:
defining a data collection for grouping objects of various source types;
associating a first object of a first source type with the data collection, the first object being an application;
associating a second object of a second source type with the data collection, the first source type and the second source type being different source types;
generating a combined representation of data received in association with the first object of the first source type and the second object of the second source type, the combined representation including at least a first item associated with the first object of the first source type and a second item associated with the second object of the second source type;
dynamically selecting and arranging the first item and the second item within one container of a user interface based at least in part on a combination of frequency of data received in association with the first object and the second object; and
presenting the user interface that displays, prior to launching the application to execute certain data that is pushed to the application by a service provider and is associated with the data collection, the data collection, the user interface including
a sources section for displaying representations of objects associated with the data collection comprising:
a first representation of the first object associated with the data collection, and
a second representation of the second object associated with the data collection, and
a content section comprising the combined representation, the sources section and the content section being different containers of the user interface.

2. The method as recited in claim 1, wherein the application is a mobile application.

3. The method as recited in claim 1, wherein the combined representation of data received from the first object is a graphical representation.

4. The method as recited in claim 1, wherein the combined representation of data received from the first object is a textual representation.

5. The method as recited in claim 1, wherein the content section includes at least one of:
a media section for displaying graphical representations of the data received in association with one or more objects associated with the data collection; or
a feeds section for displaying textual representations of the data received in association with one or more objects associated with the data collection.

6. The method as recited in claim 1, wherein the data received in association with the first object includes at least one of:
data from a Really Simple Syndication (RSS) feed;
a social networking post;
a subscription email; or
data received automatically through an application.

7. The method as recited in claim 1, wherein:
the first object is associated with a data source; and
the second object is not associated with the data source.

8. The method as recited in claim 7, wherein the first object is at least one of:
an application;
a subscription to a Really Simple Syndication (RSS) feed;
an email subscription; or
a social network contact.

9. The method as recited in claim 1, wherein the data received in association with the first object is broadcast data.

10. A mobile computing device comprising:
a processor;
a memory communicatively coupled to the processor;
a plurality of objects at least partially stored in the memory, at least one of the plurality of objects representing an entity with which a user may interact; and
a data collection application at least partially stored in the memory and executable on the processor, the application including:
a data collection definition module to:
create user-defined data collections; and
associate the plurality of objects with the user-defined data collections; and
a user interface module to:
display representations of the user-defined data collections;
receive a user selection of a particular user-defined data collection; and
in response to the received user selection:
display representations of the plurality of objects associated with the particular user-defined data collection in a sources container; and
display a combined representation of data received in association with individual ones of the one or more of the plurality of objects associated with the particular user-defined data collection, in which the combined representation includes items from a Really Simple Syndication (RSS) feed and a social network contact, wherein the items are dynamically selected and arranged within one container based at least in part on a combination of frequency of the data received in association with individual ones of the one or more of the plurality of objects and the one container is different than the sources container.

11. The mobile computing device as recited in claim 10, wherein the data collection definition module is further configured to receive a user-submitted request to associate a particular object of the plurality of objects with a particular one of the user-defined data collections.

12. One or more computer storage devices encoded with instructions that, when executed, direct a computing device to perform operations comprising:
creating multiple data collections for associating together a plurality of applications and a plurality of social network contacts;
receiving data over a network, the data being received based at least in part on a particular application of the plurality of applications and a particular social network contact of the plurality of social network contacts;
presenting a user interface that displays the multiple data collections;
in response to a user selection on a theme of the multiple themes, transitioning the user interface to display collection corresponding to the theme, the multiple data collections corresponding to multiple themes, the user interface including:
an area for displaying representations of the plurality of applications and the plurality of social network contacts; and
a visible container for displaying the data that is received, in which the data includes items provided by the particular application and the particular social network contact, wherein the items are dynamically selected and arranged within the visible container based at least in part on a criterion, wherein the area is a different portion of the user interface than the visible container.

13. One or more computer readable devices as recited in claim 12, wherein the user interface displays the data that is received without launching the particular application.

14. One or more computer readable devices as recited in claim 12, wherein the data collection is further for associating other interactive objects with the plurality of applications.

15. One or more computer readable devices as recited in claim 14, wherein the other interactive objects include at least one of:
- an email subscription; or
- a Really Simple Syndication (RSS) feed.

16. One or more computer readable devices as recited in claim 14, wherein the area for displaying representations of the plurality of applications also displays representations of the other interactive objects associated with the plurality of applications.

17. One or more computer readable devices as recited in claim 14, wherein the area for displaying the data that is received also displays data received over the network based at least in part on one or more of the other interactive objects.

18. One or more computer readable devices as recited in claim 17, wherein the data that is received over a network based at least in part on one or more of the other interactive objects is received without user interaction with the one or more of the other interactive objects.

19. One or more computer readable devices as recited in claim 12, wherein the particular application is a mobile application.

20. One or more computer readable devices as recited in claim 12, wherein the creating the multiple data collections for associating together the plurality of applications and the plurality of social network contacts comprises automatically creating the multiple data collections for associating together the plurality of applications and the plurality of social network contacts based on one or more determined relationships between the plurality of applications and the plurality of social network contacts.

* * * * *